United States Patent

Low et al.

[15] 3,670,168
[45] June 13, 1972

[54] LIGHT DIRECTION SENSOR

[72] Inventors: George M. Low, Deputy Administrator of the National Aeronautics and Space Administration with respect to an invention of; Alan R. Johnston, 1226 Olivelane, La Canada, Calif. 91011

[22] Filed: Oct. 1, 1970

[21] Appl. No.: 77,220

[52] U.S. Cl. ..........................250/225, 250/203 R, 350/147, 356/141, 356/152
[51] Int. Cl. .....................G01j 1/36, G01b 11/26, G01c 1/00
[58] Field of Search..................356/114, 115, 116, 117, 141, 356/152; 250/203 R, 225; 350/147

[56] References Cited

UNITED STATES PATENTS

| | | | |
|---|---|---|---|
| 3,471,235 | 10/1969 | Van Vliet et al. | 356/114 |
| 3,584,959 | 6/1971 | DelCarlo et al. | 356/117 |
| 3,388,629 | 6/1968 | Brenholdt et al. | 250/203 R |
| 3,409,781 | 11/1968 | Immarco et al. | 356/117 |

*Primary Examiner*—Ronald L. Wibert
*Assistant Examiner*—V. P. McGraw
*Attorney*—J. H. Warden, Paul F. McCaul and John R. Manning

[57] ABSTRACT

A light direction sensor is disclosed for providing third axis control of spacecraft. The light direction sensor comprises a direction-sensitive modulator positioned before a set of telescopic light gathering optics which, in turn, is followed by a detector. The direction-sensitive modulator comprises birefringent crystal means cut at suitable angles so that the retardation suffered by the light beam would be dependent upon the direction from which the light beam is incident upon the crystal means. The crystal means is coupled with an electro-optic phase modulator which adds a sinusoidal retardation to the light beam. The crystal means and modulator are positioned between crossed polarizers to convert the beam retardation to intensity varying at a certain frequency. The transmitted intensity is then collected by the telescopic optics and led to the detector.

15 Claims, 4 Drawing Figures

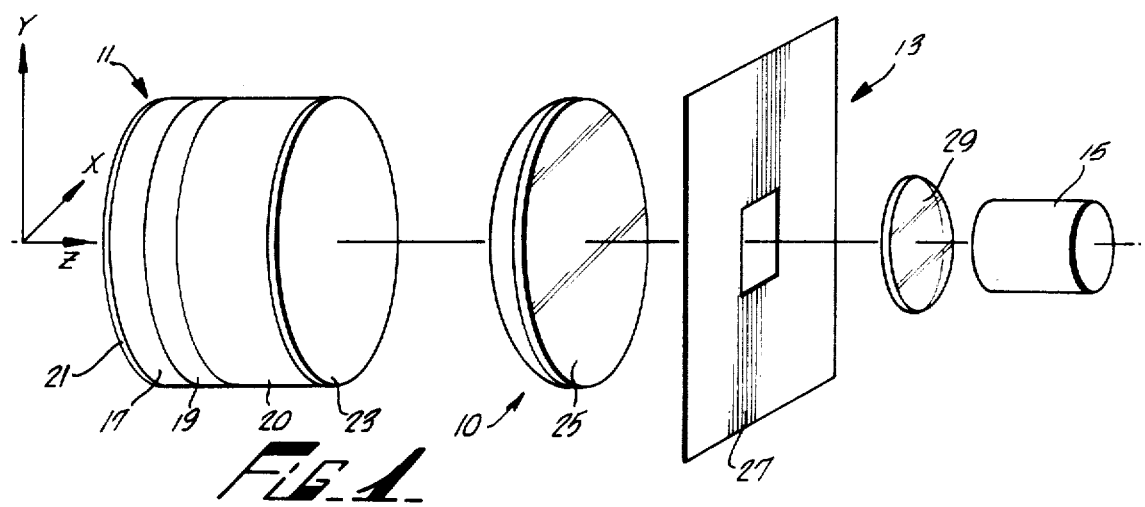
FIG. 1
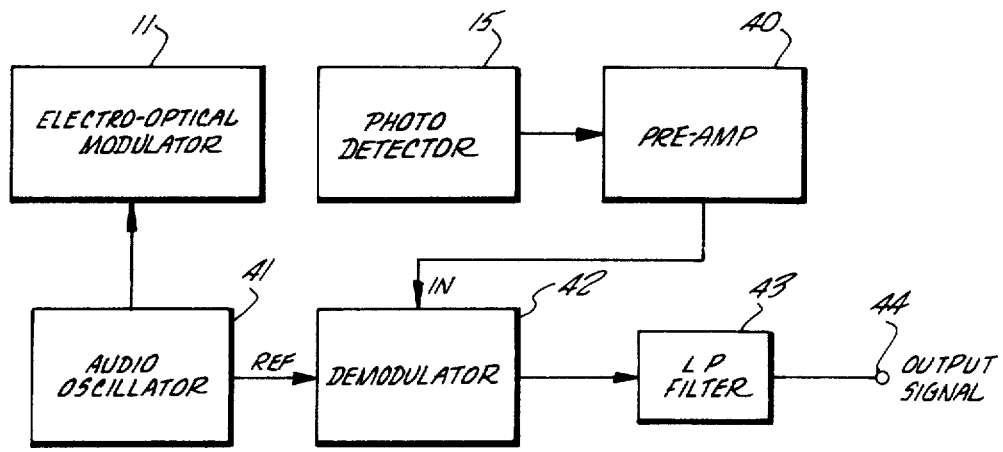
FIG. 4
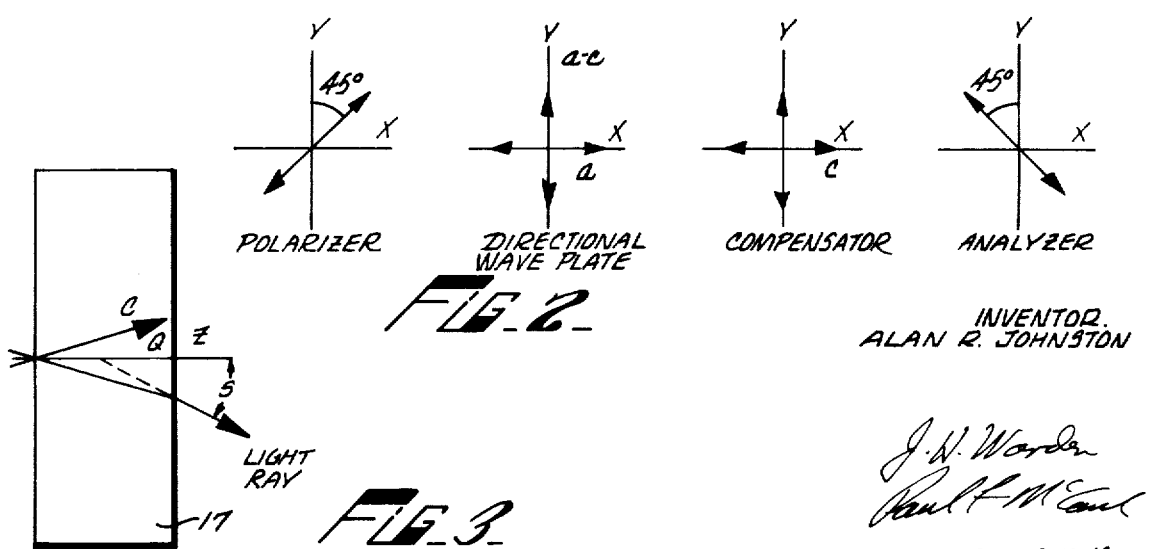
FIG. 2
FIG. 3
INVENTOR.
ALAN R. JOHNSTON
ATTORNEYS.

3,670,168

LIGHT DIRECTION SENSOR

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

BACKGROUND OF THE INVENTION

1. Field of the Invention

The invention relates to light sensing devices and more particularly to a light sensing device for controlling orientation of an object relative to the sun or other light source.

2. Description of the Prior Art

To date, space vehicles have all been attitude-controlled in three axis to provide a known and stable orientation during flight. Although inertial sensors are utilized in such spacecraft to provide short-term position, stability and rotation rate control, attitude control throughout the major portion of the flight is maintained by optical sensors.

Space vehicles have used the sun as a yaw and pitch reference object as well as a source of electrical power.

Although various reference objects have been utilized for roll-stabilization, the most ideally located roll reference is the star Canopus. Canopus is the second brightest star in the sky and is situated about fifteen degrees from the south ecliptic pole.

Spacecraft attitude control is typically initiated immediately after separation from the last stage rocket. Gyros provide limiting rate control and damping during the acquisition phase. Yaw and pitch acquisition of the sun is accomplished first with the spacecraft orientation being controlled so as to null the sun sensor error signals. Subsequently, the spacecraft is rolled about the sun line at a fixed rate under gyro control until Canopus enters the star sensor field of view and is acquired. Shortly thereafter, the gyros are turned off.

The spacecraft's star sensor functions (1) to identify each star that enters the field of view during the roll search and (2) to provide a signal proportional to the roll-error angle to the attitude control circuitry when Canopus is identified. The identification process in the sensor consists of measuring the star intensity and comparing it with a previously calibrated value.

Error-angle information is obtained by repetitively scanning a slit field of view across the image field and then measuring the modulation phase of the star signal that appears. Gimballing is provided to accommodate the apparent motion of Canopus. During the course of an orbit by the sun-pointing spacecraft, the star field will appear to rotate about the ecliptic pole and the sun-spacecraft-Canopus angle will vary sinusoidally, with a peak-to-peak excursion of 30°.

In the early development stages, star sensor design had relied principally on mechanical devices for star signal modulation and gimballing. However, with the duration of missions becoming increasingly longer, the probability of failure of a mechanical device was considered to be unacceptably large.

As a result, an all-electrostatic image dissector was developed which combined in one envelope the gimballing, scanning and photomultiplier detector functions. In such a device, the star field is imaged by a short focal-length objective onto a photo-cathode. The emitted photo-electrons are accelerated by a focus electrode with the star field image being formed by the electrons on a grounded electron aperture plate. Those electrons which pass through the slit aperture enter a 12-stage electron multiplier.

The star field scanning and gimballing are accomplished by deflecting the electron trajectories with transverse electric fields. This is done with a deflection structure located within the dissector having two interleaved sets of deflection plates form to the inner surface of a cone. The conjugate electron image is sinusoidally scanned across the slit aperture. The resulting signal is processed by a half-wave phase-sensitive demodulator to develop the error-angle signal and by a peak detecting circuit to measure the star illumination intensity.

The peak detector output is compared against a reference level with the difference signal being fed into an automatic gain-control loop which varies the electron multiplier voltage. The intensity signal is telemetered to earth while the roll error-angle is delivered to the attitude control logic.

Although the image dissector for detecting the direction of incidence of the light beam emanating from Canopus operates satisfactorily, the device does have serious shortcomings. One such shortcoming is that the image dissector is very expensive to produce. Moreover, the production of such a device requires a long lead time. As a result, a less expensive and more readily procurable device is desirable.

OBJECTS AND SUMMARY OF THE INVENTION

The present invention obviates the above-mentioned shortcoming by providing a light direction sensor that can be manufactured at much less cost and in a shorter procurement cycle. The light direction sensor comprises a direction-sensitive modulator positioned before a set of telescopic light gathering optics, which, in turn, is followed by a detector. The direction-sensitive modulator comprises birefringent crystal means coupled with an electro-optic phase modulator positioned between a pair of crossed polarizers. The telescopic light gathering optics comprises an objective lens, field stop and field lens while the detector comprises a photomultiplier. The birefringent crystal is cut at a suitable angle so that the retardation suffered by a light beam would be dependent upon the direction of propogation of the light beam. The electro-optic modulator adds a sinusoidal retardation to the light beam. By placing the birefringent crystal means and the modulator between the crossed polarizers, the retardation is converted to intensity varying at the modulation frequency. The transmitted intensity is then collected by the telescopic optics in order to obtain the resultant photosignal from the detector.

A primary object of the present invention is to provide a novel direction-sensitive modulator that is relatively inexpensive to manufacture and which can be coupled with a conventional set of telescopic optics and detector means with no modification to them.

Another object of the present invention is to provide a light direction sensor utilizing the anisotropic refractive properties of suitable crystals.

Still another object of the present invention is to provide an intensity modulator whose characteristics are dependent on light direction.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings.

BRIEF DESCRIPTION OF THE DRAWINGS

FIG. 1 is a schematic view of the light direction sensor of the present invention;

FIG. 2 is a vector diagram showing the annular relationships of the axes of the various elements within the embodiment viewed along the Z direction:

FIG. 3 is a vector diagram of the light ray traversing the directional wave plate; and FIG. 4 is an electronic block diagram of the component of the photosignal extracted with a demodulator.

DESCRIPTION OF THE PREFERRED EMBODIMENT

Referring now to the drawings, FIG. 1 shows a light direction sensor, generally indicated by arrow 10, comprising a direction-sensitive modulator 11 positioned before a set of telescopic light gathering optics 13 which, in turn, is followed by a detector 15.

The direction-sensitive modulator 11 comprises a sandwich of five anisotropic elements in plane-parallel relationship which is intended to operate in a beam of nearly parallel light. These five elements include a directional wave plate 17 in the form of a birefringent crystal located adjacent to a compensator 19 of the same material. An electro-optic phase modulator 20 follows the compensator 17 with the three elements being positioned between a pair of crossed polarizers, i.e., the polarizer 21 and the analyzer 23.

The telescopic light gathering optics 13 comprise an objective lens 25, a field stop 27, and a field lens 29, while the detector 15 can be either a conventional photomultiplier or a solid-state diode.

Geometrically, the direction-sensitive modulator 11 acts as a window while the telescope 13 and detector 15 combination receives the light passing therethrough.

OPERATION

The function of the light direction sensor 10 will be described by following a light ray through the device. A coordinate system having a Z coordinate along the nominal axis of the sensor 10; a Y coordinate vertical and within the plane of FIG. 1; and an X coordinate normal to the plane of the figure will be used.

Referring now to FIG. 2, the polarizer 21 is sheet Polaroid oriented with its transmitting axis at 45° to X and Y. The function of the polarizer is, of course, to polarize the light, i.e., let through only that light which is vibrating in one particular direction. Thus the light wave incident on the directional wave plate 17 is composed of equal X and Y components, in phase with each other.

The directional wave plate 17 is cut from an optically uniaxial crystal such as quartz, potassium dihydrogen phosphate, or ammonium dihydrogen phosphate, so that its optic axis C, shown in FIG. 3, is at an angle Q with the direction normal to the slice. The projection of the optic axis, labeled a–c in FIG. 2 is aligned with the Y direction. As indicated by the usual index ellipsoid construction, the incident Y polarized component is transmitted as an extraordinary ray for which the optical index of refraction depends on the angle between the wave normal and the C axis, while the X component is transmitted as an ordinary ray with an index independent of direction.

As shown in FIG. 3, the extraordinary Y polarized ray is traveling at a small angle S from the Z axis in the Y-Z plane. The angle between the wave normal inside the crystal and the C axis will depend approximately linearly on S for small values of S. As a result, the extraordinary index Ne will be approximately by $$Ne = Ne(S) \approx Neo + Ne'S + Ne''S^2$$

Since the index Ne varies with S, the phase of the extraordinary ray relative to that of the ordinary ray, i.e., the retardation R of the plate, depends similarly on S. Therefore, the Y polarized light emerging from the directional wave plate will be retarded, or shifted in phase with respect to the X polarized component. The amount of phase shift depending on S is $$R = A + BS + \text{(higher order terms)}$$

As such, the retardation of the directional wave plate changes in a linear way, if the direction of the light ray given by S, changes. It is this direction dependent retardation that is sensed, so that it becomes the mechanism by which the directional information is obtained from the light beam.

The compensator 19 following the directional wave plate functions to remove the large constant part of the retardation A. The compensator 19 is also cut from a uniaxial crystal, but with the C axis in the plane of the slice and oriented with C in the X direction. Thus oriented, its retardation $R_c$ is not strongly direction dependent.

The electro-optic modulator 20 is of a conventional configuration, for example, a KDP(potassium dihydrogen phosphate)wafer having both its C axis and the applied field oriented normal to the wafer. The modulator 20 is driven sinusoidally so that it adds to the beam from the compensator 19 and wave plate 17 a retardation $$Rm = M \sin wt$$

Thus the total retardation is the sum $$R_t = A + BS - R_c + M \sin wt$$

Since it is possible to make $R_c = A$ by selecting the proper thickness of the compensator 19, $$R_t = Bs + M \sin wt$$

By placing the analyzer 23 after the electro-optic modulator 20, a form of intensity modulator is obtained, similar to that used in a polarimeter, but one whose characteristics are dependent on light direction, rather than the plane of polarization. The transmitted intensity is $$I = I_o \sin^2 R_t$$

For small S and small M, this expression contains a term of frequency W of the form $$I/I = (\text{const}) \, S \sin wt$$

along with higher harmonics.

The component of the photosignal at frequency $w$ which has an amplitude proportional to the angle $S$ is extracted in the usual way with a demodulator 42 as shown in FIG. 4, producing a voltage at output 44 proportional to the angular deviation of the light beam from a nominal reference direction. The noise bandwidth of the system is determined by the cut-off frequency of the low-pass filter 43, while the modulator 11 operates at a suitable frequency, preferably about 10 KC derived from the audio oscillator 41.

It should be noted that various modifications can be made to the apparatus while still remaining within the purview of the following claims.

What is claimed is:

1. In an electrical optical direction sensor for providing a measure of the angle between a source of light and a nominal axis of the sensor, the combination which comprises:
   polarizing means for linearly polarizing a light signal;
   a directional wave plate having an optical axis at an angle to the nominal axis, the directional wave plate being arranged to develop a pair of orthogonally related signals and retarding one of said signals with respect to the other as a function of the angle between the source and the nominal axis;
   an electro-optical modulator having an optical axis aligned with the nominal axis for phase modulating the light signal from the wave plate;
   an analyzer for converting the phase modulated signal into an amplitude modulated light signal; and
   means for detecting and demodulating the light signal from the analyzer to provide an output signal which is a measure of said angle.

2. The combination as defined in claim 1 including a compensator positioned between the directional wave plate and the modulator for compensating for the retardation by the directional wave plate of light coincident with the nominal axis.

3. The combination as defined in claim 1 wherein the directional wave plate is a plate of birefringent crystal with the plate being cut so that its optical axis is at an angle of approximately 45° to the nominal axis.

4. The combination as defined by claim 3 wherein the electro-optical modulator is a plate of birefringent crystal cut with its optical axis perpendicular to the plane of the plate and aligned with the nominal axis.

5. The combination as defined in claim 4 including a compensator plate of a birefringent crystal positioned between the wave plate and the modulator, the compensator plate having a thickness to provide a retardation of the light signals passing therethrough which is equal to the retardation of the directional wave plate for a predetermined direction of light propagation.

6. The combination as defined in claim 1 wherein the polarizing means and the analyzer comprise sheets of light polarizing material oriented at ninety degrees with respect to each other.

7. The combination as defined in claim 6 wherein the electro-optical modulator sinusoidally modulates said one light signal.

8. The combination as defined in claim 7 wherein the means for detecting and demodulating the light signal from the analyzer includes:

telescope means including a field stop for collecting said amplitude modulated light signal;

detector means for providing an electrical signal representative of the modulated light signal; and demodulator means for demodulating said electrical signal.

9. In an optical direction sensor for providing a measure of the angle between a source of light and a nominal axis of the sensor, the combination which comprises:

polarization means positioned on the nominal axis for linearly polarizing light from the source;

a directional wave plate positioned on the nominal axis for receiving light transmitted through the polarizing means and retarding at least a portion of said light as a function of the angle between the source and the nominal axis, the directioanl wave plate having an optical axis disposed at an angle to the nominal axis;

an electro-optical modulator positioned on the nominal axis and having an optical axis aligned with the nominal axis for phase modulating the retarded light signal from the directional wave plate; and means for detecting and demodulating the light signal from the electro-optical modulator to provide an output signal which is a measure of said signal.

10. The combination as defined in claim 9 wherein the last named means includes an analyzer and a detector positioned in that order to receive light from the modulator, the analyzer comprising a polarizing means for converting the phase modulated signal into an amplitude or intensity modulated light signal, the detector including means for detecting and demodulating the light signal from the analyzer.

11. The combination as defined in claim 10 wherein the directional wave plate is a plate of birefringent crystal with the plate being cut so that its optical axis is at an angle of approximately 45° with the nominal axis.

12. The combination as defined in claim 11 wherein the electro-optical modulator is a plate of birefringent crystal cut with its optical axis perpendicular to the plane of the plate and aligned with the nominal axis.

13. The combination as defined in claim 12 including a compensator plate of a birefringent crystal positioned between the wave plate and the modulator to compensate for the retardation of light signals passing through the directional wave plate which are parallel to the nominal axis.

14. The combination as defined in claim 13 wherein the polarizing means and the analyzer comprises light polarizing members oriented at 90° with respect to each other.

15. The combination as defined in claim 12 wherein the modulator sinusoidally modulates the retarded light signal.

* * * * *